(12) United States Patent
Johannessen et al.

(10) Patent No.: US 7,577,497 B2
(45) Date of Patent: *Aug. 18, 2009

(54) INDUSTRIAL ROBOT WITH PORTABLE EMERGENCY STOP UNIT

(75) Inventors: Svein Johannessen, Oslo (NO); Jan Endresen, Asker (NO); Erik Carlson, Nesoddtangen (NO); Ralph Sjöberg, Västerås (SE)

(73) Assignee: ABB AB, Västerås (SE)

( * ) Notice: Subject to any disclaimer, the term of this patent is extended or adjusted under 35 U.S.C. 154(b) by 897 days.

This patent is subject to a terminal disclaimer.

(21) Appl. No.: 10/473,744

(22) PCT Filed: Apr. 2, 2002

(86) PCT No.: PCT/SE02/00644

§ 371 (c)(1),
(2), (4) Date: Mar. 5, 2004

(87) PCT Pub. No.: WO02/078913

PCT Pub. Date: Oct. 10, 2002

(65) Prior Publication Data

US 2004/0260426 A1 Dec. 23, 2004

(30) Foreign Application Priority Data

Apr. 2, 2001 (SE) .................................... 0101199

(51) Int. Cl.
G06F 19/00 (2006.01)
H04Q 5/22 (2006.01)
G05B 19/00 (2006.01)

(52) U.S. Cl. .................. 700/245; 340/10.1; 340/10.51; 340/10.52; 700/260; 700/250; 700/255; 318/568.11

(58) Field of Classification Search ................. 700/1–2, 700/17, 19–20, 28, 40, 83, 245, 248–249; 340/10.1, 10.51–10.52, 10.5, 10.42, 5.5, 340/5.51, 5.6; 318/567–569; 901/3, 4, 6, 901/8, 9, 46
See application file for complete search history.

(56) References Cited

U.S. PATENT DOCUMENTS 4,835,711 A * 5/1989 Hutchins et al. ............ 700/247

(Continued)

FOREIGN PATENT DOCUMENTS

DE 19536293 1/1997

(Continued)

OTHER PUBLICATIONS

Publication No. (EP 0 310 958 A1), Title: Portable apparatus for teaching a robot or other automatic machines, Authors: Fujii, Kenjiro; Oura, Masao; Tsuburaya, Kazuyuki; Hagura, Shigehisa, Date: Dec. 4, 1989.*

(Continued)

*Primary Examiner*—Khoi Tran
*Assistant Examiner*—Ian Jen
(74) *Attorney, Agent, or Firm*—Venable LLP; Eric J. Franklin (57) ABSTRACT

An industrial robot including a manipulator, a control unit for controlling the manipulator, a portable operating unit for teaching and manually operating the robot, which operating unit is adapted for wireless communication with the control unit, and an emergency stop unit. The emergency stop unit is arranged movable and the portable operating unit includes a first receiving member for receiving the emergency stop unit.

16 Claims, 3 Drawing Sheets

U.S. PATENT DOCUMENTS

| | | | | |
|---|---|---|---|---|
| 4,888,708 | A | * 12/1989 | Brantmark et al. | 700/264 |
| 5,760,560 | A | * 6/1998 | Ohya et al. | 318/568.1 |
| 5,991,510 | A | * 11/1999 | Beaulieu | 700/250 |
| 6,362,813 | B1 | * 3/2002 | Worn et al. | 345/169 |
| 6,529,785 | B1 | * 3/2003 | Keeley | 700/83 |
| 6,697,681 | B1 | * 2/2004 | Stoddard et al. | 700/17 |
| 7,208,900 | B2 | * 4/2007 | Carlson et al. | 318/568.11 |

FOREIGN PATENT DOCUMENTS

| | | | |
|---|---|---|---|
| DE | 19536293 | A1 | 1/1997 |
| DE | 19951233 | A1 | 5/2000 |
| DE | 19920299 | A1 | 11/2000 |
| DE | 10023199 | A1 | 1/2001 |
| EP | 0310958 | | 4/1989 |
| EP | 0536417 | | 4/1993 |
| EP | 1014406 | A1 | 6/2000 |
| GB | 2336890 | | 11/1999 |
| JP | 11073201 | A | 3/1999 |
| KR | 2001009584 | | 11/2001 |
| WO | WO-01/71878 | A1 | 9/2001 |

OTHER PUBLICATIONS

German Office Communication—Jun. 15, 2007 (With Translation).

* cited by examiner

INDUSTRIAL ROBOT WITH PORTABLE EMERGENCY STOP UNIT

FIELD OF THE INVENTION

The present invention relates to an industrial robot comprising a manipulator, a control unit for controlling the manipulator, a portable operating unit for teaching and manually operating the robot, which operating unit is adapted for wireless communication with the control unit, and an emergency stop unit for stopping the manipulator upon activating it.

The present invention also relates to an industrial robot system comprising a plurality of industrial robots, each having a manipulator, a control unit for controlling the manipulator and an emergency stop unit for stopping the manipulator upon activating it, and at least one portable operating unit for teaching and programming the robots, which portable operating unit is adapted for wireless communication with the control units.

The present invention further relates to a portable operating unit for an industrial robot having a manipulator and a control unit for controlling the manipulator, the operating unit comprising means for manually operating the robot and means for wireless communicating with the control unit.

The present invention further relates to a method for controlling the functioning of an emergency stop unit for an industrial robot comprising a manipulator, a control unit for controlling the manipulator, and a portable operating unit for teaching and manually operating the robot, which portable operating unit is adapted for wireless communication with the control unit.

The invention also relates to the use of an industrial robot for operation control of a spot welding station.

A portable operating unit is generally denoted a teach pendant, and is used for manually controlling the robot, for example to teach or program the robot to follow an operating path.

PRIOR ART

Robots are used to carry out repetitious and precise tasks, such as welding and painting of components. The robots are programmed to carry out a work or a work cycle along an operating path. In order to program or teach the robot its working cycle, the robot is manipulated to various positions along the desired operating path. These positions are stored as instructions in a memory in the control unit. Other information, such as desired robot movement velocity, may also be stored in the memory. During operation of the robot, the program instructions are executed, thereby making the robot operate as desired.

Various devices used to facilitate the programming of robots are known in the art. For example U.S. Pat. No. 4,888, 708 issued to Brantmark et al discloses a portable teach pendant, for teaching and manually operating the robot, by use of a joystick, a keyboard, and a visual display unit. The keyboard has various function keys which permit an operator to select different states for the control system. The teach pendant may for example be used for monitoring the robot program, changing certain variables in the program, starting, stopping and editing the program, and for manually moving the manipulator by use of the joystick. The operator is teaching the robot while watching the motion of the manipulator.

A robot can be operated in at least two modes: automatic and manual. The choice of mode, in which the robot shall operate, is made by switching a mode selector key on a control panel on the control unit. When the robot is in the manual mode, the teach pendant has the exclusive right to operate the robot and thus no other operating units are allowed to control the robot. When the robot is in the automatic mode, some of the functions in the teach pendant are blocked, for example the functioning of the joystick.

The teach pendant disclosed in the above mentioned U.S. patent is connected to the control unit via a flexible cable or wire. There are many problems related to having a cable between the control unit and the teach pendant, particularly when there are several robots arranged near each other in a robot line. The cable between the teach pendant and the control unit has to be rather long and the risk for twisting the cables of the robots is considerable. Neighboring robots could also have their cables twisted with each other and thus it is sometimes difficult to know to which robot a certain teach pendant belongs. There is also a risk for breakage of the cables resulting in loss of communication between the teach pendant and the control unit.

From the German patent No. DE 195 36 293 it is known to use a wireless link for exchange of information between the teach pendant and the robot. One advantage with a wireless connection between the robot and the teach pendant is the possibility of using the same teach pendant for several robots. Accordingly, the teach pendant does not belong to a certain robot, and may be used together with any of the robots in a robot cell.

Robots are usually placed in robot cells in order to facilitate the automation of a complex series of actions. When one of the robots in a robot cell is to be placed under manual control using a wireless teach pendant, it is important that the teach pendant is communicating with and controlling the correct robot. It must be possible to ensure correct association between the wireless teach pendant and the control unit. Otherwise, there is a risk for personal injury, should the operator believe that he is operating a certain robot but is instead operating another robot in the cell. Thus, a problem arising when using a teach pendant not physically connected with the robot, is how to ensure that the correct robot is connected with the teach pendant.

Another problem with wireless communication between the robot and the teach pendant is the functioning of the emergency stop button on the teach pendant when the teach pendent is not connected with any robot. For safety reasons it is required that a visible emergency stop button stops the robot at any time the button is pushed. Accordingly, the teach pendant is not allowed to have a visible emergency stop button when it is not connected to any of the robots.

SUMMARY OF THE INVENTION

The object of the present invention is to provide an industrial robot having a wireless operating unit which overcomes the problems mentioned above and in particular the problem in connection with the functioning of the emergency stop button.

This object is achieved by means of the initially defined industrial robot, characterised in that said emergency stop unit is arranged movable and the portable operating unit comprises a first receiving member for receiving the emergency stop unit. Preferably, the emergency stop unit comprises an emergency stop button. Such movable emergency stop unit makes it possible to remove the emergency stop button from the operating unit, when the operating unit is not connected to any robot, and then return the emergency stop button to the operating unit when the operating unit is connected to a robot.

Accordingly, it is ensured that if the operating unit has a visible emergency stop button, the emergency stop button will function.

According to an embodiment of the invention, the robot comprises a second receiving member for receiving the emergency stop unit, arranged at or in connection with the control unit. Preferably, the control unit comprises means for sensing the presence of the emergency stop unit and means for enabling the emergency stop unit upon presence in the second receiving member and the portable operating unit comprises means for sensing the presence of the emergency stop unit and means for enabling the emergency stop unit upon presence in the operating unit. For safety reasons, it is important that the emergency stop button always works, even when it is not used in the operating unit. To ensure that the emergency stop button always functions, the emergency stop button is moved to a second receiving member in connection with the control unit when it is not used in the operating unit. The emergency stop button is enabled when the emergency stop unit has been received, either by the first receiving member or by the second receiving member.

According to a further embodiment of the invention, said movable emergency stop unit comprises means for carrying information about the identity of the robot, and the portable operating unit comprises means for reading the robot identity from the emergency stop unit. To ensure that the emergency stop button on the operator unit, upon activation, deactivates the correct robot, an identification of the robot is transmitted to the operating unit together with the movable emergency button. Accordingly, it is possible to ensure correct association between the wireless operating unit and the control unit of the robot and the risk for emergency stopping the wrong robot is reduced.

According to a further embodiment of the invention the control unit comprises means for comparing the identity of the robot with the identity carried by the emergency stop unit and determining whether the identities are equal. A problem associated with having a movable emergency stop unit is the risk for returning the emergency stop unit to the wrong robot. This problem is solved by providing the control unit with means for checking the identity of a received emergency stop unit.

According to a further embodiment of the invention the portable operating unit comprises means for establishing a communication with the control unit of the identified robot. A communication between the operating unit and the control unit of a robot cannot be established until the operating unit has received information about the identity of the robot, to which it shall be associated. Since the identification of the robot is transferred together with the emergency stop unit, no communication could be established until the emergency stop unit is present in the operating unit. Thus, the operating unit is not able to control the robot if the emergency stop button is not present. When a communication is established with the control unit, the control unit knows that the operating unit has received the emergency stop button.

According to a further embodiment of the invention, the communication between the portable operating unit and the control unit is carried out via a base station and the movable emergency stop unit comprises means for carrying information about the address of the base station. To facilitate the establishment of the communication between the portable operating unit and the control unit, the address of the base station is transferred to the operating unit through the emergency stop unit. For a robot cell, having several robots connected to a base station, the number of emergency stop units could be the same as the number of robots in the cell. The emergency stop units will all have the same base station address, but different robot identities.

According to a further embodiment of the invention the control unit comprises means for measuring the time elapsed between the point of time when the emergency stop unit is removed from the second receiving member until a communication is established between the portable operating unit and the control unit. Preferably, the control unit comprises means for comparing said time with a predetermined maximum time and activating the emergency stop unit depending on the result of said comparison. For the purpose of detecting a loss of the emergency stop unit, a timer is started upon removal of the emergency stop unit from the control unit. The timer is stopped when the emergency stop unit is received by the operating unit and the communication is established. If the time exceeds a predetermined maximum time, an emergency stop of the robot is executed.

According to a further embodiment of the invention, the movable emergency stop unit comprises an electronic hardware device, for example an information storage device. According to a further embodiment of the invention, the movable emergency stop unit comprises a processor.

According to a further embodiment of the invention, the control unit comprises means for detecting lack of robot identity in the emergency stop unit and means for transferring the identity of the robot to the emergency stop unit. Preferably, the control unit also comprises means for detecting lack of robot identity in the control unit itself and means for transferring the identity of the robot from the emergency stop unit to the control unit.

A further object of the invention is to provide an industrial robot system having a plurality of robots and at least one wireless operating unit which could operate anyone of the robots, if correctly associated with it, which robot system overcomes the problems mentioned above and in particular the problem in connection with the functioning of the emergency stop button.

Another object of the invention is to provide a wireless portable operating unit overcoming the problem in connection with the functioning of the emergency stop button.

Another object of the invention is to provide a method for ensuring the functioning of an emergency stop unit for an industrial robot.

Many of the above mentioned means are effectuated by software instruction run on a processor in the operating unit or on a processor in the control unit.

BRIEF DESCRIPTION OF THE DRAWINGS

The invention will now be explained more closely by the description of different embodiments thereof and with reference to the appended drawings.

DETAILED DESCRIPTION OF PREFERRED EMBODIMENTS OF THE INVENTION

Figure 1:
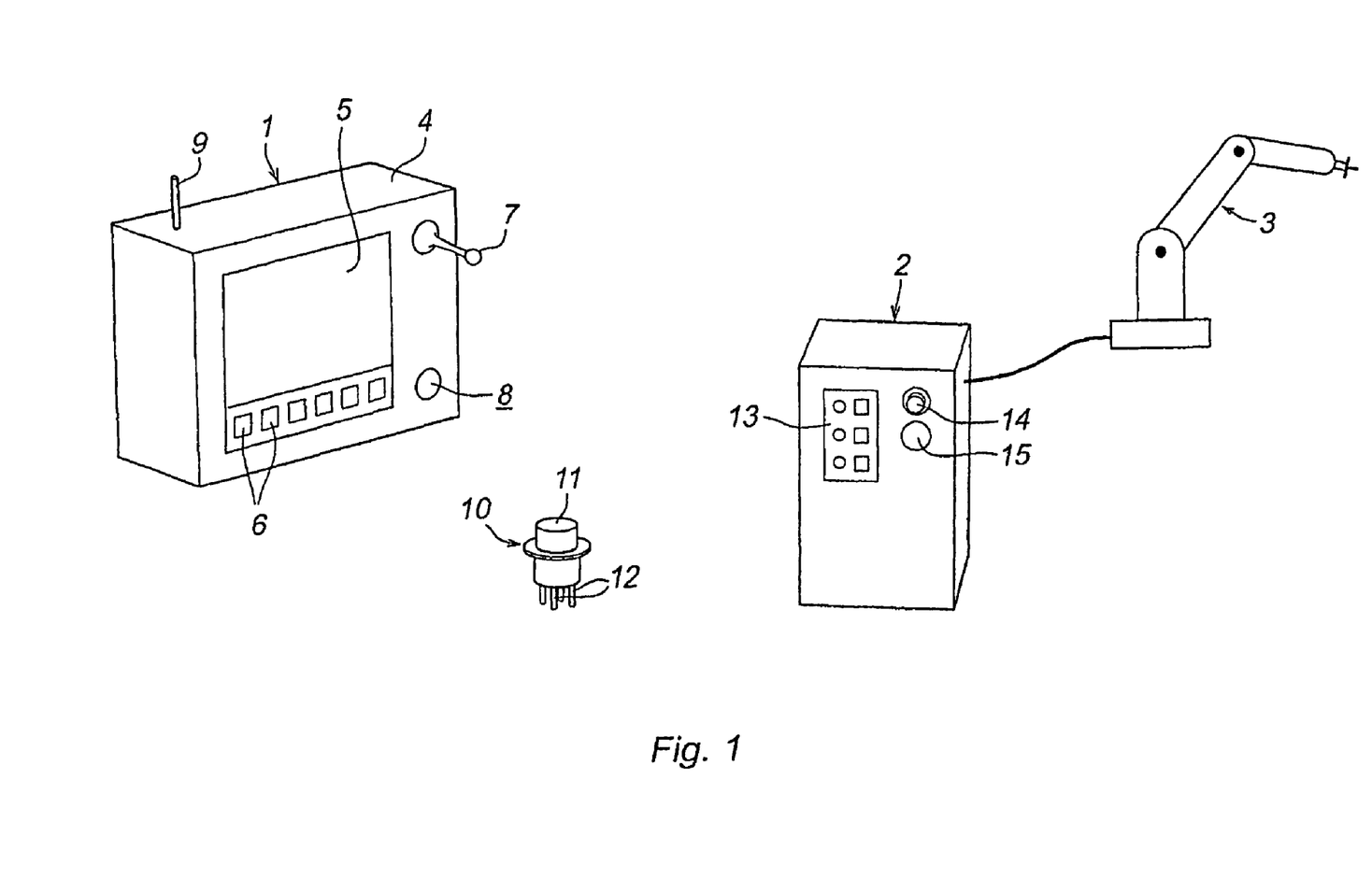
FIG. 1 is a perspective view of an industrial robot according to one embodiment of the invention, comprising an operating unit adapted for wireless communication with a control unit of the robot.

FIG. 1 shows an industrial robot according to the invention, comprising a portable operating unit 1 and a control unit 2 coupled for transmitting data via a communication cable or a link to a manipulator 3. The operating unit and the control unit are adapted for radio communication with each other. The control unit 2 is capable of receiving, processing and outputting data sent to it from the operating unit. The operating unit 1 comprises a body 4, a display screen 5 and a set of function keys 6, and a joystick 7. The function keys 6 permit an operator to select various states for the control system. The joystick is used for controlling the movement of the manipulator when the robot is manually operated and could be used as a mouse. The operating unit 1 further comprises an antenna 9 for radio communication with the control unit 2 and an opening 8 adapted for receiving a movable emergency stop unit 10. The control unit 2 comprises an operator panel 13 having keys for setting the control unit, an emergency stop button 14 and an opening 15 adapted for receiving the movable emergency stop unit 10.

Figure 2:
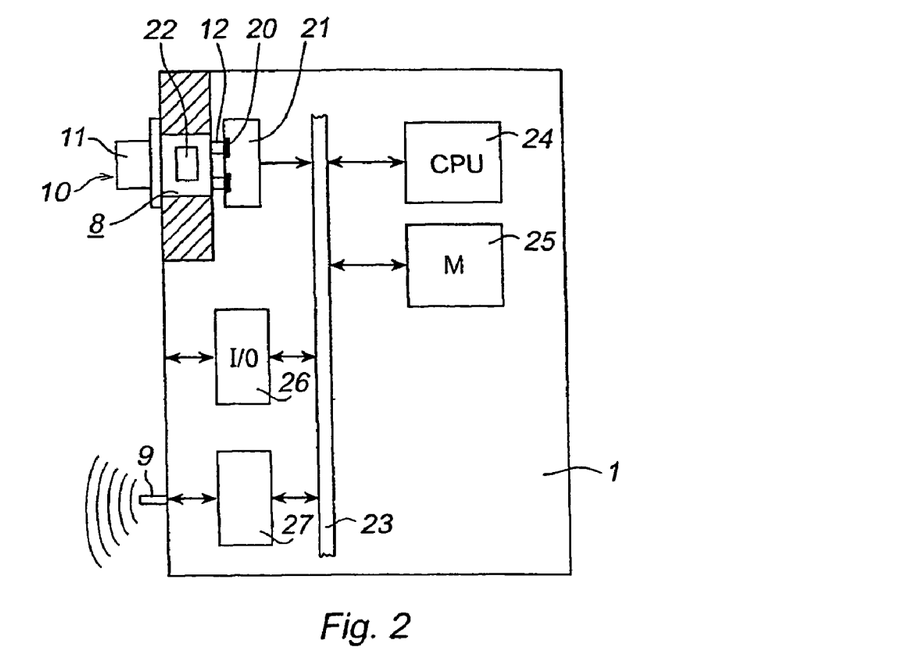
FIG. 2 is a block diagram of the operating unit according to one embodiment of the invention.

FIG. 2 shows the operating unit 1 having received the movable emergency stop unit 10. At least a part of the emergency stop unit 10 is inserted into the opening 8. The emergency stop unit 10 includes an emergency stop button 11 and contact elements 12 adapted for being in electrical contact with corresponding contact elements 20 on a receiving member 21 positioned inside the operating unit 1. The emergency stop unit 10 further comprises an electronic hardware device 22 including a memory or a register adapted for storing information about the identity of the robot, to which the emergency stop unit belongs. The receiving member 21 is adapted for sensing the presence of the emergency stop unit 10 in the operating unit and reading information about the robot identity from the hardware device 22 to a data bus 23. The robot is arranged so that, the power supply to the manipulator is broken upon pushing the emergency stop button 11. When the emergency stop unit 10 is received in the operating unit 1, the button 11 is enabled and will trigger an emergency stop if activated. The enabling of the emergency stop button is effectuated by software instruction run on the processor unit 24.

When the operating unit 1 has received the emergency stop unit 10, the contact elements 12 of the emergency stop unit 10 and the contact elements 20 of the receiving member 21 are in electrical contact with each other. Information about the identity of the robot is transmitted from the hardware device 22 to the data bus 23 by the receiving member 21. The operating unit 1 further comprises a processing unit 24 adapted for processing data programs for controlling the function of the operating unit, a memory 25 for storing the data programs and the information about the robot identity, interface means 26 for coupling input and output signals between the data bus 23 and the display screen 5, the function keys 6 and the joystick 7, and a coupling element 27 for converting and coupling data between the antenna 9 and the data bus 23.

Figure 3:
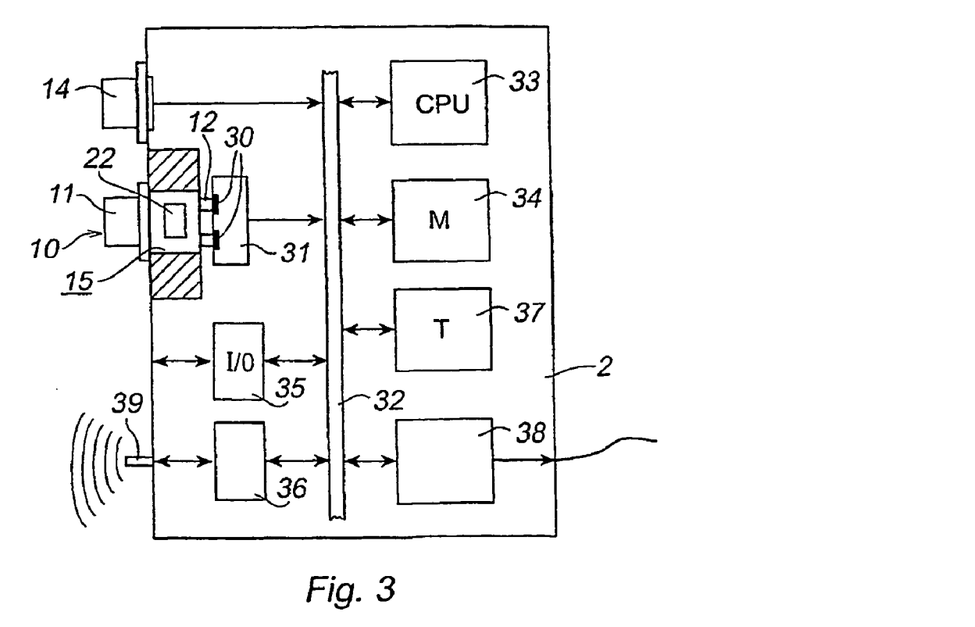
FIG. 3 is a block diagram of the control unit of an industrial robot according to one embodiment of the invention.

FIG. 3 shows the control unit 2 having received the movable emergency stop unit 10. At least a part of the emergency stop unit 10 is inserted into the opening 15. The contact elements 12 of the emergency stop unit 10 are adapted for being in electrical contact with corresponding contact elements 30 on a receiving member 31 positioned inside the control unit. The receiving member 31 is adapted for sensing the presence of the emergency stop unit 10 in the control unit 2 and reading the information about the robot identity from the hardware device 22 in the emergency stop unit 10 to the data bus 32. The control unit 1 further comprises a processing unit 33, a memory 34 for storing data programs and parameters, a first interface means 35 for transmitting input and output signals between the data bus 32 and the operator panel 13, a coupling element 36 for converting and coupling data between an antenna 39 and the data bus 32, and a second interface means 38 for transmitting data and control signals between the data bus 32 and the manipulator. The control unit 1 also includes a timer unit 37, discussed below.

When the emergency stop unit 10 is received by the control unit 2, the emergency stop button 11 is enabled, i.e. upon pushing the emergency stop button 11 the power supply to the manipulator is broken. The enabling of the emergency stop button is effectuated by software instruction run on the processor unit 33. Thus, the control unit has two working emergency stop buttons 10, 14. The control unit needs two emergency stop buttons for ensuring that it always is provided with a stop button, even though one of them is moved to the operating unit.

When the operating unit 1 is not used, the emergency stop unit 10 is positioned at the control unit 2. If an operator decides to use the operating unit, he moves the emergency stop unit 10 to the operating unit 1. The receiving member 21 senses the presence of the emergency stop unit 10 and reads the information about the robot identity from the hardware device 22 and transmits it, via the data bus 23, to the processor unit 24. When the processor unit has received the information about the robot identity, it establishes a radio contact with the control unit 2 of the identified robot, via the coupling element 27 and the antenna 9.

When the operating unit 1 is not to be used, the emergency stop unit 10 is returned to the control unit 2 and remains there until the next time the operating unit 1 is to be used. When the receiving member 31 in the control unit has sensed the presence of the emergency stop unit 10, it transmits the information about the robot identity from the hardware device 22, via the data bus 32, to the processor unit 33. When the processor unit 33 has received the information about the robot identity, it compares it with a stored robot identity, for the purpose of checking that the received emergency stop unit is the correct one, belonging to the robot. If the identities are not the same, the control unit will not accept receiving the emergency stop unit and will generate an alarm signal.

For the purpose of detecting a loss of the emergency stop unit 10, the timer unit 37 is started when the emergency stop unit 10 is removed from the control unit 2 and is stopped when the emergency stop button is received by the operating unit 1 and the communication is established. When the timer runs out, i.e. when the time elapsed exceeds a predetermined maximum value, an emergency stop is executed or any other action is taken.

The robot may be operated in an automatic or a manual mode. Normally, the robot is in the automatic mode during work and in the manual mode during teaching. In an embodiment of the invention, the switching between the automatic and the manual mode could be effected by moving the emergency stop unit from the control unit to the operating unit and vice versa. Accordingly, upon sensing the presence of the emergency stop unit in the control unit, the robot is operated in automatic mode, i.e. the robot is under automatic control, and upon sensing the presence of the emergency stop unit in the operating unit, the robot is operated in the manual mode, i.e. the robot is controlled by the operating unit.

Figure 4:
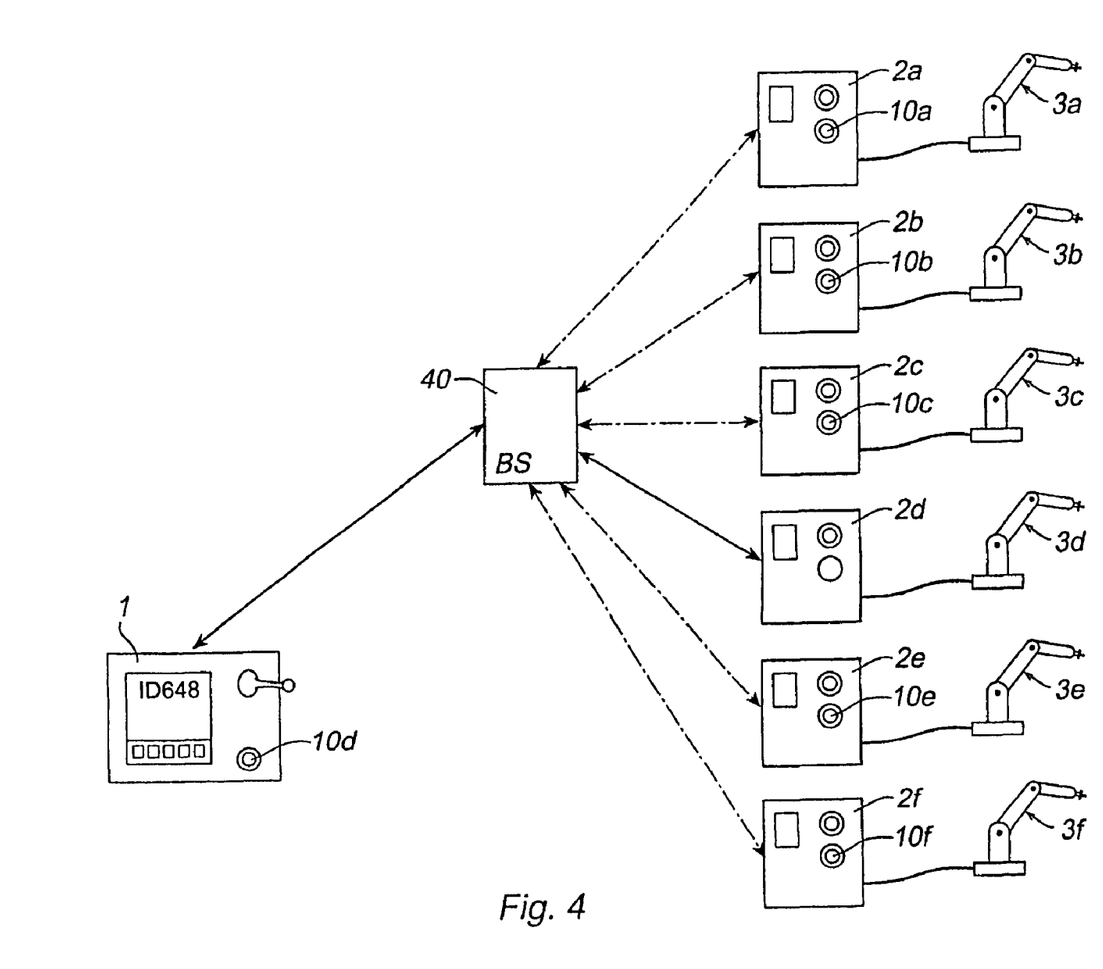
FIG. 4 shows an industrial robot system according to one embodiment of the invention, comprising an operating unit in wireless communication with the robots.

FIG. 4 shows a robot cell having six robots, each comprising a manipulator 3a-3f and a control unit 2a-2f. Each robot can be controlled via a portable operating unit 1. The control units 2a-2f and the operating unit 1 are adapted for being in radio communication with each other via a base station 40. For activating the operating unit 1 it needs to have the address to the base station 40 and the identity of the robot to which it shall be connected. This is done by moving the movable emergency stop unit from the selected robot to the operating unit. Beside the robot identity, the hardware unit 22 comprises the address to the base station. The robot identity includes the network address of the robot to be controlled by the operating unit. The six emergency stop units 10a-10f have the same base station address but different robot identities. In the example shown in FIG. 4, the robot comprising controller 2d is selected for being controlled by the operating unit 1. Thus, the emergency stop button 10d is moved to the operating unit 1.

Each of the robots in the cell has an emergency stop unit. If the cell comprises more than one operating unit 1, the emergency stop units can be used in any of the operating units, but the control units will only accept one unique emergency stop unit. The linking between a robot and an operating unit is done by use of the movable emergency stop button. Any number of operating units can be active in the cell, but the only operating unit able to manipulate the robot is the one in possession of its emergency stop button.

Upon return of the emergency stop unit 10d to the control unit 2d, the operating unit 1 will send a message to the control unit informing it about the fact that the emergency stop unit has been removed from the operating unit. This will stop the manipulator and start the timer in the control unit. The timer is stopped when the control unit has received the emergency stop unit. If the transfer time exceeds a predetermined value, the emergency stop will be activated. If it is not possible to communicate with the control unit when the emergency stop unit is removed from the operating unit, the manipulator is stopped from the moment the communication is broken, until the control unit has received the emergency stop unit.

As long as the emergency stop unit is not present in the control unit, the communication with the operating unit is supervised and the control unit will emergency stop the robot if the communication is broken and the emergency stop unit is not returned within a predetermined time interval. The communication can for example be broken if the operating unit leaves the radio coverage area. Thus, if the emergency stop unit is still in the operating unit when the operating unit leaves the radio coverage area, the robot will be emergency stopped.

For safety reasons it is sometimes desirable to emergency stop some, or all of the robots in a robot cell or in the same working area, upon activation of the emergency stop button on the operating unit. Accordingly, in an embodiment of the invention the emergency stop unit is adapted for comprising further information about identities of robots which shall be emergency stopped at the same time upon activation of the emergency stop button.

In another embodiment of the invention, the emergency stop unit comprises a first part fixedly arranged in the control unit and a second movable part. The second movable part is used for message encryption and the first part is used for message decryption.

The present invention is not limited to the embodiments disclosed but may be varied and modified within the scope of the following claims. For example, the means for carrying information about the identity of the robot could be implemented in a number of different ways, such as a physical key device, magnetic means, or visible information. The means for reading the robot identity from the emergency stop unit could for example be a mechanical, magnetic or optical reading means. The electronic hardware device in the emergency stop unit is preferably comprising a processor and software instructions.

The invention claimed is:

1. An industrial robot, comprising:
a manipulator;
a movable emergency stop unit comprising an emergency stop button configured when enabled to trigger an emergency stop of the manipulator upon activation;
a control unit for controlling the manipulator, the control unit comprising a first receiving member configured to receive the emergency stop unit, the control unit further comprising a sensor configured to detect the presence of the emergency stop button in the first receiving member and a processor configured to enable the emergency stop button upon detecting the presence of the emergency stop unit in the first receiving member; and
a portable operating unit for teaching and manually operating the robot, the portable operating unit comprising a second receiving member configured to receive the emergency stop unit removed from the control unit, the portable operating unit further comprising a sensor configured to detect the presence of the emergency stop button in the second receiving member and a processor configured to enable the emergency stop button and establish wireless communication with the control unit upon detecting the presence of the emergency stop unit in the second receiving member,
wherein the emergency stop unit is movable back and forth between the first receiving member of the control unit and the second receiving member of the portable operating unit.

2. The industrial robot according to claim 1, wherein said movable emergency stop unit comprises means for carrying information about an identity of the robot and the portable operating unit comprises means for reading the robot identity from the emergency stop unit.

3. The industrial robot according to claim 1, wherein the control unit comprises means for comparing an identity of the robot with an identity carried by the emergency stop unit and determining whether the identity of the robot and the identity carried by the emergency stop unit are equal.

4. The industrial robot according to claim 1, wherein the communication between the portable operating unit and the control unit is carried out via a base station and the movable emergency stop unit further comprises means for carrying information about the address of the base station.

5. The industrial robot according to claim 1, wherein the control unit further comprises means for measuring a time elapsed between a point of time when the emergency stop unit is removed from the second receiving member until when a wireless communication is established between the portable operating unit and the control unit.

6. The industrial robot according to claim 5, wherein the control unit further comprises means for comparing said time with a predetermined maximum time and activating the emergency stop unit depending on the result of said comparison.

7. The industrial robot according to claim 2, wherein the control unit further comprises means for detecting lack of robot identity in the emergency stop unit and means for transferring the identity of the robot to the emergency stop unit.

8. The industrial robot according to claim 2, wherein the control unit further comprises means for detecting lack of robot identity in the control unit itself and means for transferring the identity of the robot from the emergency stop unit to the control unit.

9. The industrial robot according to claim 1, further comprising:
a spot welding apparatus.

10. A method for ensuring the functioning of a movable emergency stop unit for an industrial robot comprising a manipulator, a movable emergency stop unit comprising an emergency stop button configured when enabled to trigger an emergency stop of the manipulator upon activation, a control unit for controlling the manipulator, the control unit comprising a first receiving member configured to receive the emergency stop unit, the control unit further comprising a sensor configured to detect the presence of the emergency stop button in the first receiving member and a processor configured to enable the emergency stop button upon detecting the presence of the emergency stop unit in the first receiving member, a portable operating unit for teaching and manually operating the robot, the portable operating unit comprising a second receiving member configured to receive the emergency stop unit removed from the control unit, the portable operating unit further comprising a sensor configured to detect the presence of the emergency stop button in the second receiving member and a processor configured to enable the emergency stop button and establish wireless communication with the control unit upon detecting the presence of the emergency stop unit in the second receiving member, the method comprising:
  moving the emergency stop unit from the second receiving member of the control unit to the first receiving member of the portable operating unit;
  detecting the presence of the emergency stop unit in the first receiving member of the portable operating unit;
  establishing wireless communication between the portable operating unit and the control unit;
  enabling the emergency stop unit in the first receiving member of the portable operating unit; and
  actuating the emergency stop unit to stop movement of the manipulator.

11. The method according to claim 10, further comprising:
transmitting information about the identity of the robot from the emergency stop unit to the portable operating unit.

12. The method according to claim 10, further comprising:
measuring a time elapsed between a point of time when the emergency stop unit is being removed from the place at or in connection with the control unit until said communication is established between the operating unit and the control unit.

13. The method according to claim 10, further comprising:
moving the emergency stop unit from the operating unit to said place at or in connection with the control unit and checking whether the received emergency stop unit carries the same identification as the robot connected to the control unit.

14. An industrial robot system, comprising:
a plurality of industrial robots, each robot comprising
  a manipulator;
  a movable emergency stop unit comprising an emergency stop button configured when enabled to trigger an emergency stop of the manipulator upon activation, the emergency stop unit also configured to store information about an identity of the robot to which the emergency stop unit belongs; and
  a control unit for controlling the manipulator, the control unit comprising a first receiving member configured to receive the emergency stop unit, the control unit further comprising a sensor configured to detect the presence of the emergency stop button in the first receiving member and a processor configured to enable the emergency stop button upon detecting the presence of the emergency stop unit in the first receiving member;
a portable operating unit for teaching and manually operating the robots, the portable operating unit comprising a second receiving member configured to receive the emergency stop unit removed from one of the control units, the portable operating unit further comprising a sensor configured to detect the presence of the emergency stop button in the second receiving member and a processor configured to read the identity of the robot to which the emergency stop unit belong and to enable the emergency stop button and establish wireless communication with the control unit of the robot to which the emergency stop button belongs upon detecting the presence of the emergency stop unit in the second receiving member.

15. The industrial robot system according to claim 14, wherein each of the robots comprises a processor configured to determine whether the received emergency stop unit carries the same identification as the robot.

16. The industrial robot according to claim 14, wherein one of the robots further comprises a spot welding apparatus.

* * * * *

UNITED STATES PATENT AND TRADEMARK OFFICE
CERTIFICATE OF CORRECTION

| | |
|---|---|
| PATENT NO. | : 7,577,497 B2 |
| APPLICATION NO. | : 10/473744 |
| DATED | : August 18, 2009 |
| INVENTOR(S) | : Johannessen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Seventh Day of September, 2010

David J. Kappos
*Director of the United States Patent and Trademark Office*